Feb. 22, 1938.  P. LANDROCK  2,109,373
PHOTOGRAPHIC FILM INDICATOR
Filed Feb. 1, 1933  4 Sheets-Sheet 2
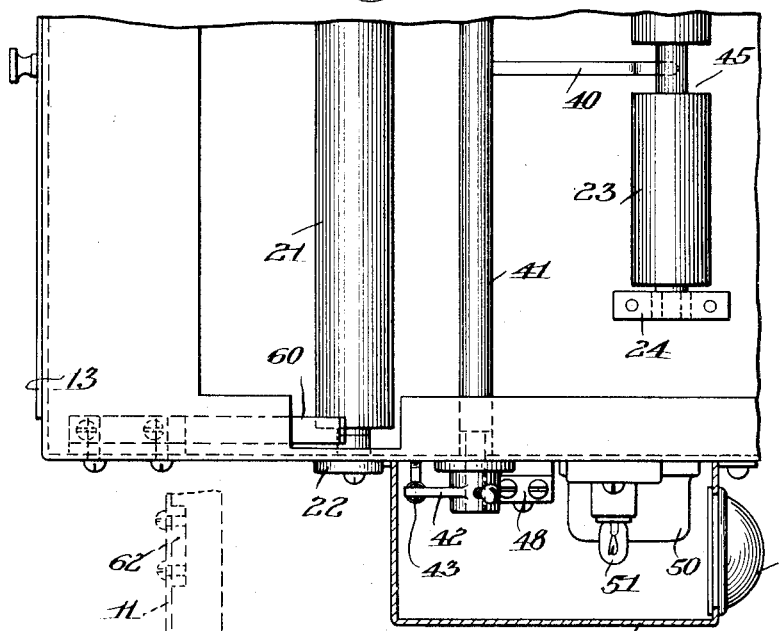
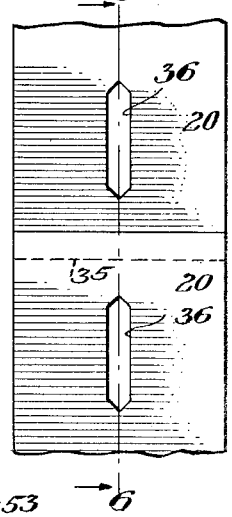
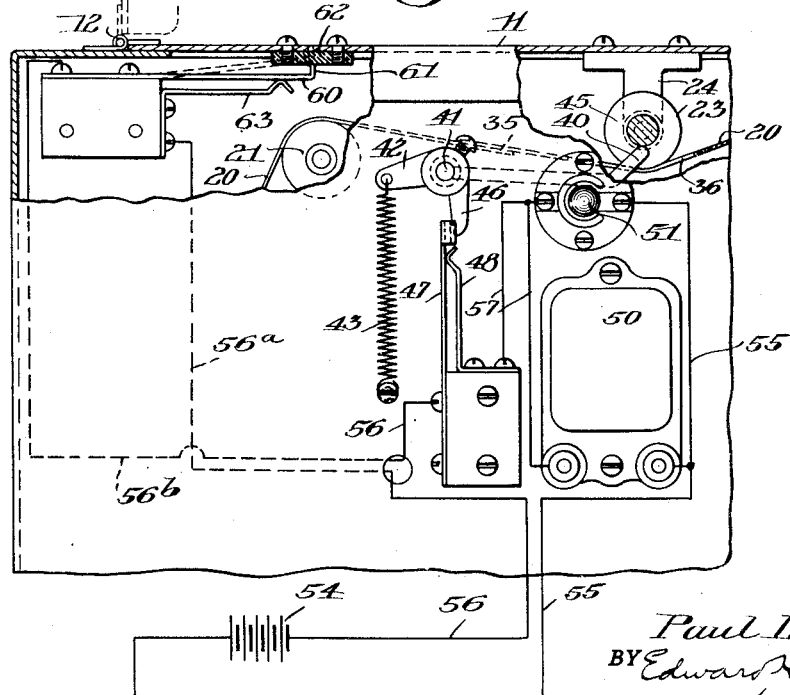
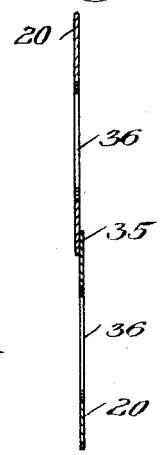
INVENTOR
Paul Landrock
BY Edward H. Cumpston
his ATTORNEY Feb. 22, 1938.   P. LANDROCK   2,109,373
PHOTOGRAPHIC FILM INDICATOR
Filed Feb. 1, 1933   4 Sheets-Sheet 3
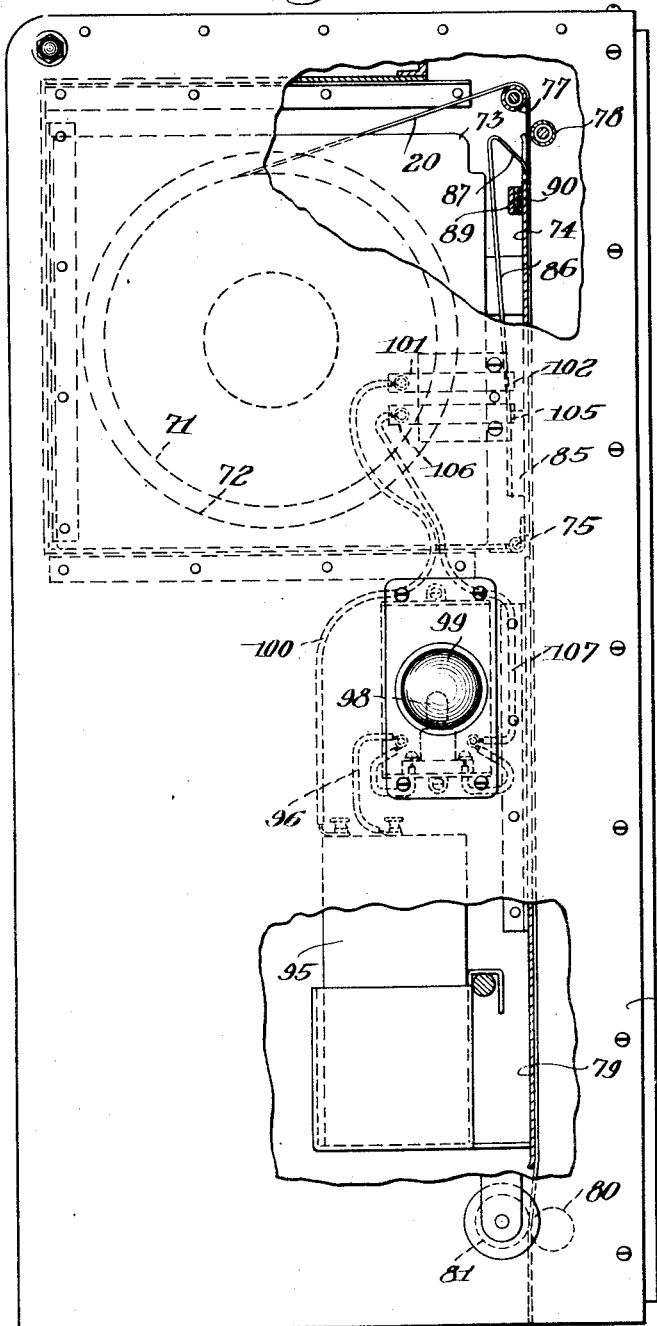
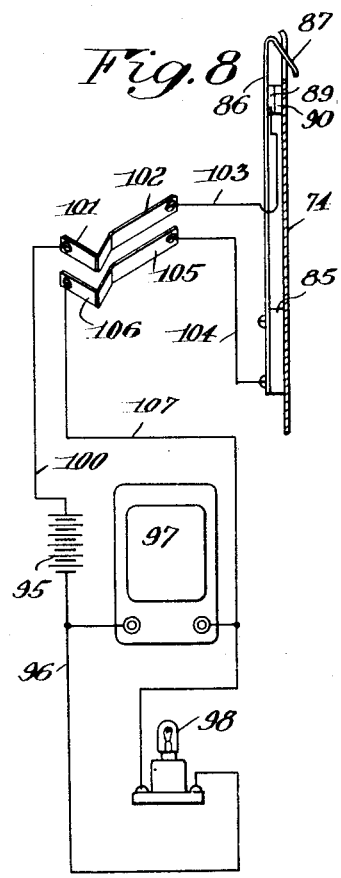
INVENTOR
Paul Landrock
BY Edward H. Cumpston
his ATTORNEY

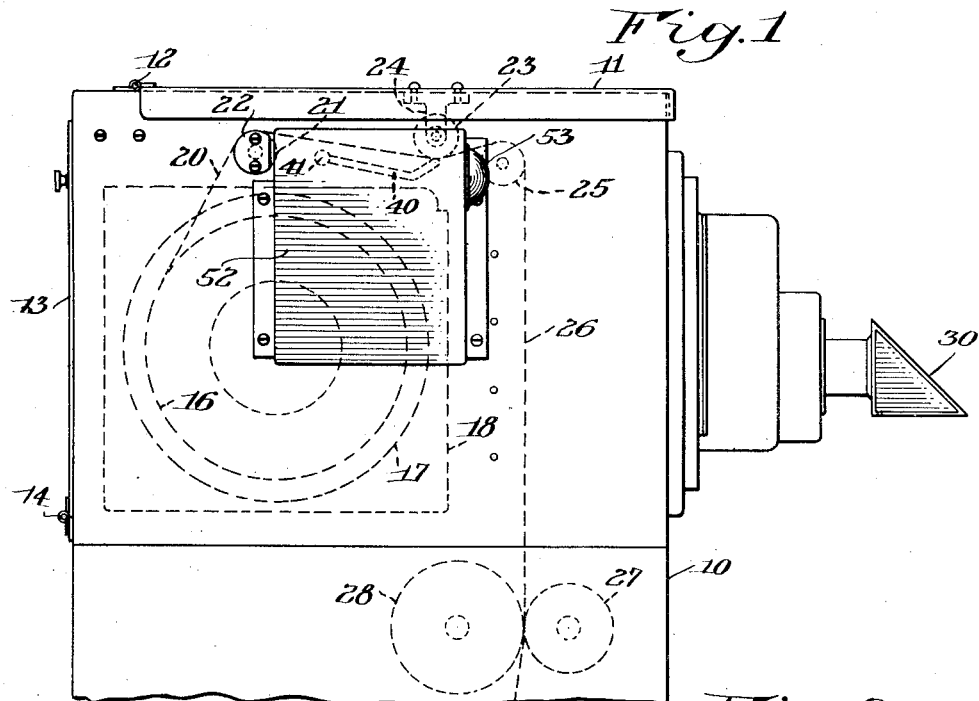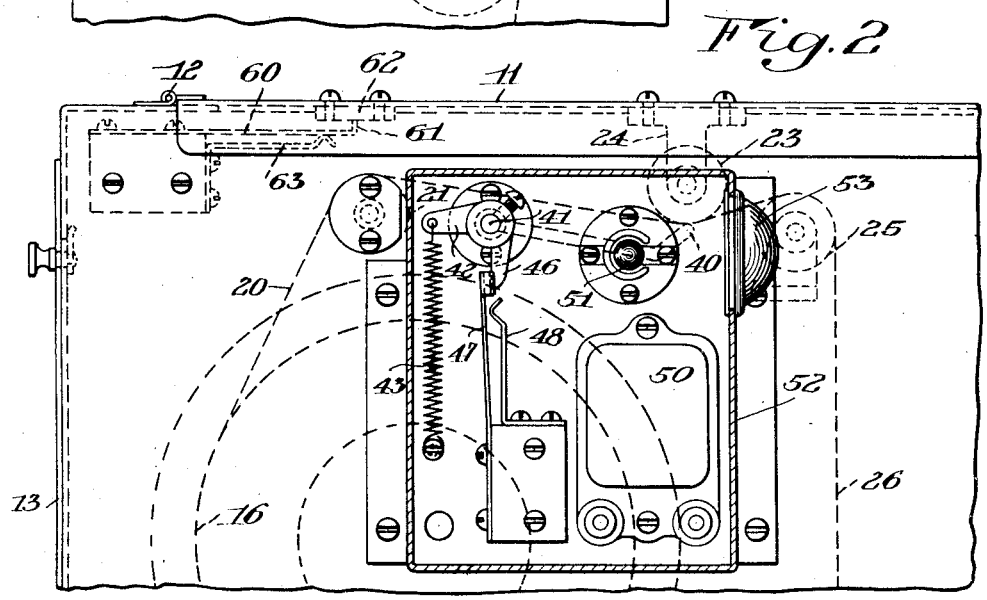

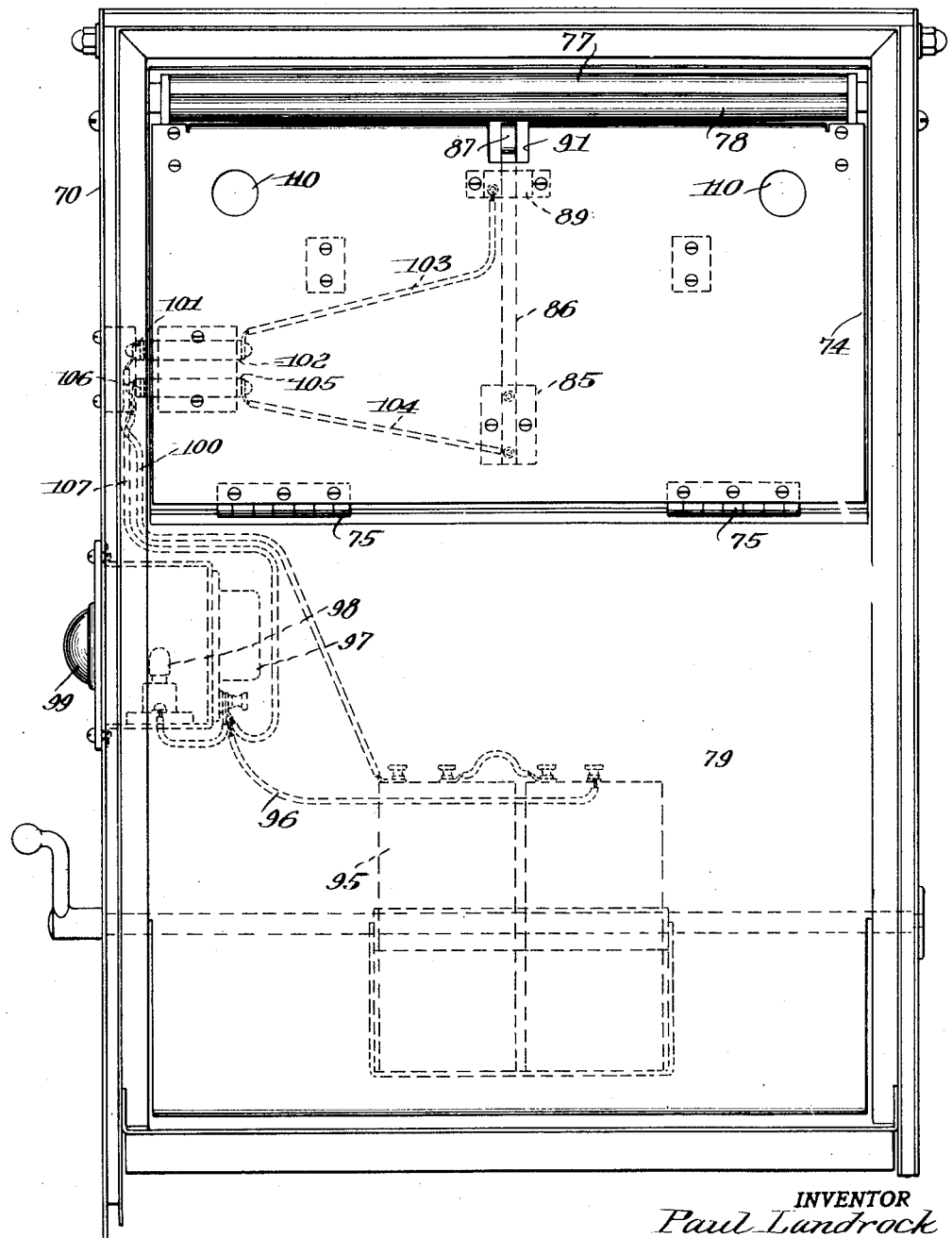

Patented Feb. 22, 1938

2,109,373

UNITED STATES PATENT OFFICE 2,109,373

PHOTOGRAPHIC FILM INDICATOR

Paul Landrock, Rochester, N. Y., assignor to Photostat Corporation, Providence, R. I., a corporation of Rhode Island Application February 1, 1933, Serial No. 654,671

7 Claims. (Cl. 177—311)

This invention deals with photographic apparatus and more especially with a camera for use with a supply of film.

In certain types of cameras, particularly in so-called "commercial cameras" and similar apparatus, it is customary to supply film in the form of a roll containing a considerable length of sheet material such as paper or the like, with a sensitized coating or emulsion on one or both sides. Such rolls of sheet material, for manufacturing reasons, frequently contain one or more splices. For best results, it is desirable not to make exposures upon the spliced portion of the film, but only upon the smooth, unbroken portions of the film between the splices.

An object of the present invention is the provision of simple, satisfactory, and inexpensive indicating mechanism for notifying the operator of the existence of a splice at or near the focal plane of the camera, so that he may feed the spliced portion beyond the focal plane and avoid making an exposure on the splice.

Another object of the invention is the provision of indicating mechanism which will signal the operator when the film supply is exhausted, so that he will not continue the making of exposures supposedly upon the film, when in fact there is no supply of film remaining to be used.

Still another object is the provision of simple and satisfactory mechanism, of sturdy and inexpensive construction, which will indicate both the splices and the exhaustion of the film.

A further object is the provision of means for rendering the indicating mechanism ineffective under certain predetermined conditions, such as when the camera is opened to insert a new supply of film, for example.

A still further object is the provision of an improved form of spliced film whereby the film may be made to operate or act upon the above mentioned indicating mechanism.

To these and other ends the invention resides in certain improvements and combinations of parts, all as will be hereinafter more fully described, the novel features being pointed out in the claims at the end of the specification.

In the drawings:

Fig. 1 is a side elevation of a portion of a camera constructed in accordance with one embodiment of the invention;

Fig. 2 is a view of part of the camera shown in Fig. 1 on an enlarged scale, with parts removed to show the interior construction;

Fig. 3 is a plan of part of the camera shown in Fig. 2, with the cover removed, and with certain parts in horizontal section;

Fig. 4 is a somewhat diagrammatic view of part of the mechanism shown in Fig. 2, embodying also a wiring diagram;

Fig. 5 is a view of a section of film showing a splice;

Fig. 6 is a section taken on the line 6—6 of Fig. 5;

Fig. 7 is a side elevation of a portion of a camera constructed in accordance with another embodiment of the invention, with parts broken away to illustrate the interior construction;

Fig. 8 is a wiring diagram of the mechanism shown in Fig. 7, and

Fig. 9 is a front view of a part of the camera shown in Fig. 7.

The same reference numerals throughout the several views indicate the same parts.

Referring now to Fig. 1 of the drawings, there is illustrated a portion of a camera having a body 10 provided with a top closure 11 hinged to the top of the body at 12 so that access to the interior of the body may be readily obtained, and a rear closure 13 hinged to the body at 14 so that this closure may be opened to remove or replace a supply of film. For example, the film may be in the form of a roll 16 wound on a spool 17 held in suitable trunnions in a roll box 18 which may be bodily removed from and replaced in the camera through the rear closure or door 13.

As the film is used, the successive convolutions are unwound from the roll 16, as indicated at 20, and drawn upwardly over a guide roller 21 mounted on bearings 22 on the casing 10, and beneath the guide roller 23 mounted in bearings 24 secured to the under side of the upper closure or door 11, and thence over another guide roller 25 and downwardly over a suitable focal plane support (not shown) which holds the film in the focal plane of the camera indicated here at 26. Below the focal plane there may be suitable film feeding means such as the feeding rollers 27 and 28 engaging opposite sides of the film to advance it in known manner.

Light entering the camera in any suitable known manner falls upon the film in the focal plane and makes an exposure thereof. For instance, light passing upwardly substantially vertically may enter a prism 30 and be bent to a substantial horizontal direction as well known in the art, thence passing leftwardly, when viewed as in Fig. 1, from the prism through a suitable lens system and shutter to the focal plane.

As previously mentioned, long rolls of film frequently contain one or more splices, for various manufacturing reasons. A piece of such film having a splice therein is illustrated in Fig. 5, the film being indicated by the numeral 20. The splice may be made in any desired manner, either by a butt joint or a lap joint, a lap joint being indicated in Figs. 5 and 6 at 35.

The present invention provides indicating mechanism for signaling to the operator of the camera the approach of a splice to the focal plane. This indicating mechanism, according to the present invention is operated by the film itself. Preferably the film is provided with one or more recesses, openings, or other structural variations adjacent the splice, which recesses, openings, or other structural variations may be in the form of notches, holes, or of other suitable construction. In the preferred form of construction, the recess is in the form of a long narrow opening placed substantially along the center line of the film a slight distance from the splice itself, as indicated at 36 in the drawings. Preferably two such recesses are used, one just in front of the splice and one just behind it, as plainly shown in Fig. 5, the two recesses being in alinement with each other longitudinally of the film, as seen in the drawings.

In the construction illustrated in Figs. 1 to 4 inclusive, the indicating mechanism is operated by a member which may be described as a feeler arm normally in contact with one side of the film in alinement with the recesses 36. As successive portions of the film are used up and the film is fed along, the recess just ahead of the splice finally comes opposite the arm, which then moves through the recess, effecting the desired indication of the presence of the splice. Preferably, the movement of the arm closes an electric circuit which operates a visible signal (such as an electric light) or an audible signal (such as an electric buzzer) or preferably both a visible signal and an audible signal.

The arm which contacts with the film is illustrated in the drawings at 40, and is fixed to a shaft 41 rotatably mounted in suitable bearings on the casing 10. The shaft 41 also has fixed to it another arm 42 pulled downwardly by a spring 43 which thus tends to elevate the end of the arm 40 and keeps it normally in contact with the film.

The contacting end of the arm 40 is in such position transversely of the film that it will be in alinement with the film recesses as they come along. That is, if the recesses are placed along the center line of the film as shown in Fig. 5, the arm 40 will likewise be at the center line of the film. The end of the arm is bent slightly upwardly, as plainly shown in the drawings, and lies just beneath the roller 23, which roller is provided with a circumferential groove or cutaway portion 45 opposite the end of the arm 40, as best shown in Fig. 3.

When a normal or unbroken expanse of film is passing the guide roller 23, the arm 40, contacting with the lower surface of the film, is held thereby in its lower position illustrated in Fig. 2. When the recess 36 reaches the arm, however, then the arm rises upwardly under the influence of its spring 43, the end of the arm passing through the recess 36 in the film, into the free space provided by the groove 45 in the roller 23. Because of the provision of this free space or groove in the roller, the movement of the arm 40 is an appreciable one, materially greater than would be the case if the arm moved simply through the thickness of the film.

The shaft 41, whose oscillations are controlled by those of the arm 40, is provided with still another arm 46 which normally engages a spring contact member 47 to hold it spaced from the associated contact member 48, as shown in Fig. 2. When the recess in the film allows the arm 40 to move upwardly to the position shown in Fig. 4, however, the consequent oscillation of the arm 46 releases the spring contact member 47 and allows it to come into contact with the member 48, thus closing an electric circuit of which the members 47 and 48 are a part, and operating the indicating means.

The indicating means itself may comprise, for example, an audible signal, such as the electric buzzer 50, and a visible signal, such as the small electric bulb 51, both contained within a small housing or casing 52 on one side of the apparatus, the electric bulb, when lit, being visible through the lens 53. Any suitable source of electric current is provided, such as a battery indicated diagrammatically at 54 in Fig. 4, and from one side of this battery a conductor 55 leads both to the buzzer 50 and to the bulb 51, while from the other side of the battery a conductor 56 leads eventually to the contact member 47, and the other contact member 48 is connected by a conductor 57 to the opposite side of the bulb and the opposite side of the buzzer.

In this way, the closing of the switch constituted by the contact members 47 and 48 results in lighting the light and sounding the buzzer. The light and buzzer are preferably connected in parallel with each other, so that if either one should burn out the other would nevertheless operate.

It is apparent that this indicating mechanism above described will be operated not only by the recesses 36 which are placed in the film adjacent the splice, but also when the film itself is exhausted. When the last of the film is unwound from the spool 17 and drawn forwardly beyond the arm 40, there will no longer be any film to hold the arm down in its normal position shown in Fig. 2, and it will spring up to the effective indicating position shown in Fig. 4.

In order to obviate the continued operation of the indicating means during the time that might elapse while a new supply of film is inserted in the camera and threaded properly through it, a second switch is preferably provided in the signal circuit, which second switch is controlled by means such as the door or closure for obtaining access to the camera. In the embodiment here illustrated, the second switch comprises a spring contact member 60 having an upturned end 61 in position to engage an insulating block 62 mounted on the under side of the closure 11 when this closure is in its normal closed position shown in Figs. 2 and 4. A cooperating contact member 63 is in contact with the member 60 when the latter is held down in normal position by the insulating block 62. When the closure 11 is opened, to the dotted line position shown in Fig. 4, then the resilience of the spring contact member 60 causes it to spring upwardly to the dotted line position shown in this figure, in which it moves away from the contact member 63 and thus opens the switch. These contact members are placed at any suitable point in the signal circuit. For example, they may be interposed in the conductor 56 leading from the battery 54 to the contact member 47, as by cutting this conductor 56 and leading its ends 56a and 56b to the contact members 63 and 60, respectively.

An operator of apparatus constructed in this way can easily learn to tell whether the signal given by the indicating means represents merely a splice, or an exhaustion of the film. When the buzzer sounds or the light lights, a slight continued feeding of the film causes the buzzer to stop sounding and the light to go out, if it is only a splice. If continued feeding, on the other hand, does not cause the buzzer to stop or the light to go out, the operator knows that the sheet material is entirely exhausted and he then opens the upper closure 11, breaking the contact between the members 60 and 63 and rendering the indicating means ineffective so that the light does not continue to burn and the buzzer does not continue to sound unnecessarily during the time spent in renewing the supply of sheet material. When the supply is renewed the door 11 is closed, of course, but before this is done the new supply of sheet material has been placed in position over the arm 40, so that when the contact members 60 and 63 are closed by shutting the door 11, the contact members 47 and 48 are at the same time opened and the indicating means does not become effective until a splice comes along.

In Figs. 7, 8, and 9 there is illustrated a different form of construction which may be used if preferred, and which accomplishes the same result.

Here, there is shown at 70 a casing comprising part of a camera body, preferably being that part commonly known as the magazine in one standard form of commercial camera available on the market. This magazine is ordinarily hinged to the rest of the camera body to swing about a vertical axis at one side of the magazine, the connection of the magazine to the rest of the body, and the construction of the rest of the body, being well understood by those skilled in the art.

The supply of film 20 may be wound on a roll 71 on a spool 72 mounted in suitable trunnions in the roll box 73. This box has a front wall 74 hinged at its bottom edge at 75 so that it may be swung downwardly and forwardly (or to the right when viewed as in Fig. 7) from the normal position shown in Fig. 7 to an open position for obtaining access to the interior of the roll box 73. This roll box 74 may be reached and opened when the entire magazine section 70 of the camera is in open position with respect to the rest of the camera body, as well understood by those skilled in the art.

Since the opening of the front wall 74 of the roll box enables access to the interior of the box, the wall 74 may be considered as a closure for the space or chamber occupied by the supply of film. At the same time, the closure 74 preferably acts also as a part of the focal plane support, constituting a backing against which part of the strip of film which is in the focal plane lies.

As the film 20 is unwound from the roller 71, it passes forwardly and upwardly, around a guide roller 77 and behind a second guide roller 78 slightly below and in front of the roller 77, as plainly shown in Fig. 7, and thence downwardly over the front face of the focal plane support 74, and in front of the plate 79 which extends downwardly from the member 74 and constitutes the lower part of the focal plane support. Thence the film passes to suitable feeding means such as the feeding rollers 80 and 81 engaging opposite sides of the film and effective, upon rotation, to advance the film from the roll 71 into and out of the focal plane.

The film, in this embodiment of the invention, is provided with the same recesses previously described in connection with Figs. 5 and 6. In the present embodiment, however, the closure member 74 is provided on its inner or rear face with an insulating block 85 preferably at a point corresponding to the center line of the film, and mounted on this insulating block is a slightly resilient member in the form of a metallic strip 86 extending upwardly to a point near the upper edge of the closure 74 and then being bent downwardly and forwardly for a short distance as at 87. The resiliency of this metallic strip 86 tends normally to press it forwardly into contact with a metallic contact member 89 mounted on an insulating block 90 on the inner face of the closure 74. The closure has a notch or opening 91 formed in alinement with the portion 87 of the arm 86, so that this portion may pass freely through the opening 91 without interference, and there is a free or unobstructed space in alinement with the notch 91 on the opposite side of the film, so that when no film is present, the portion 87 of the arm 86 may move a substantial distance across the plane of the film and into the free space.

So long as a normal unperforated expanse of film occupies the upper portion of the closure and focal plane support 74, the forwardly extending portion 87 of the arm 86 contacts with the rear surface of the film and is held thereby in its normal or rearward position illustrated in Fig. 7, in which the member 86 is spaced from the cooperating contact 89. When a recess 36 in the film reaches the position of the feeler 87, or when the film supply is exhausted so that the rear edge of the film is drawn beyond the member 87, then the film no longer holds the feeler in its rearward position but the resiliency of the feeler causes it to move forwardly, with the portion 87 projecting through the notch 91, until the member 86 comes into contact with the cooperating contact 89. This closes an electric circuit which controls an audible or visible signal, or both, in a manner similar to that described in connection with the previous embodiment of the invention.

For example, as perhaps best seen in the wiring diagram in Fig. 8, a battery 95 may be provided and a conductor 96 may lead from one side of the battery to one side of an audible signal such as the buzzer 97 and a visible signal such as the lamp 98, which is visible, when it is lit, through a lens 99 set in the camera casing.

From the other side of the battery 95, a conductor 100 may lead to a contact member 101 fastened on one end of the roll box 73 adjacent its front edge and adapted to contact, when the closure 74 is in closed position, with the contact member 102 mounted on the inner surface of the closure 74. From this contact member 102, a conductor 103 leads to the contact member 89. From the cooperating contact member 86, another conductor 104 leads to a contact member 105 similar to the contact member 102 and similarly mounted for cooperation with the contact member 106 similar to the contact member 101. Thence, a conductor 107 leads to the opposite side of the buzzer 97 and the lamp 98, which buzzer and lamp are preferably connected in parallel so that if either one should fail the other would nevertheless give the desired indication.

As in the previous embodiment heretofore described, it is seen that the opening of the closure means 74 will break the circuit by separating the contact members 102 and 105 from the contact members 101 and 106, these several contact members constituting a second switch in the circuit. Thus, when the film is exhausted, the indicating means begins to operate continuously, but unnecessary operation may be promptly stopped by the act of the operator in opening the magazine section 70 with relation to the rest of the camera and then opening the closure 74 by pulling it forwardly and downwardly, which may conveniently be done by placing a finger through either one of a plurality of finger holes 110 (Fig. 9) formed in the member 74 near its upper corners. The opening of the electric circuit by opening the closure 74 thus renders the indicating means inoperative, and they remain inoperative until the closure 74 is again closed after inserting a fresh supply of film.

In this embodiment of the invention, it is noted that the member 89 and that portion of the member 86 below the member 89, together constitute a switch. Also, the entire member 86 and portion 87 constitute an arm or feeler for operating this switch.

It is also noted that, in both embodiments of the invention herein described, it may be said that the feeler contacts with a portion of the film before it has left the focal plane of the camera. In the embodiment of Figs. 1 to 4, the feeler 40 contacts with the film shortly before it enters the focal plane. In the embodiment of Figs. 7 to 9, the feeler 87 contacts with a portion of the film substantially just as it is entering the focal plane of the camera. Consequently, in either case, the feeler may be said to cooperate with the film before it leaves the focal plane, or before it fully reaches the major portion of the focal plane, or "in advance of a portion" of the focal plane (i. e., in advance of the last portion or edge which the film leaves as it passes out of the focal plane).

The operation of the device is believed to be obvious from the preceding description, but a brief summary will now be given. In commercial cameras of the type for which the present invention is primarily intended, successive photographs are made upon successive portions of the strip of film. After each exposure, the film is fed to carry the exposed portion out of the focal plane of the camera and to bring a fresh unexposed portion into the focal plane, which feeding may be either automatic or by hand. In either case, when the operator sees the visible signal or hears the audible signal during a feeding operation, he knows either that a splice is about to be fed to the focal plane or that the end of the film has been reached and the supply is exhausted. No more exposures should be made until the splice has passed beyond the focal plane or until the supply of film has been renewed if the supply is exhausted.

If, upon continued feeding of the film through a few inches, the indicating light goes out and the buzzer stops, the operator knows that the indication is only that of a splice and is not caused by exhaustion of the film. He then continues feeding the sheet material, notices a second operation of the indicating means caused by the second recess in the film just behind the splice, and continues feeding the sheet material for a small distance after the second indication has ceased, which distance he knows, from his experience, will be sufficient to carry both the splice and the recess behind the splice, out of the focal plane of the camera. Then the taking of exposures may be resumed in the normal manner.

If the continued feeding of the film, when the indicating means is effective, does not stop the operation of the indicating means, the operator then knows that the indication is caused by exhaustion of the film rather than by a splice. He accordingly opens up the closure which controls the electric circuit, thus stopping the continued operation of the indicating means, and renews the supply of film.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. The combination with a photographic camera having a focal plane, of a supply of unexposed sensitized spliced film having a structural variation associated with each splice, means for moving successive portions of said film into the focal plane of the camera, and indicating means operated by said structural variation for indicating the approach of a splice to said focal plane.

2. The combination with a photographic camera having a focal plane, of a supply of sensitized unexposed spliced film having a structural variation adjacent the splice, means for moving successive portions of said film into the focal plane of the camera, and indicating means set into operation by said structural variation in the film for indicating the existence of a splice in predetermined relation to the focal plane.

3. The combination with a photographic camera having a focal plane, of a supply of sensitized unexposed spliced film having a structural variation in predetermined relation to a splice, means for moving successive portions of said film into the focal plane of the camera, and indicating means including a feeler in alinement with the path of travel of said structural variation for indicating the presence of said structural variation and thereby indicating the existence of a splice in predetermined relation to said focal plane.

4. Photographic apparatus comprising a camera for use with a supply of sensitized unexposed spliced film having a structural variation adjacent each splice, said camera having a focal plane, means for moving successive portions of the film into the focal plane of the camera, and electrically operated indicating means responsive to structural variations in the film for indicating the presence of a splice adjacent the focal plane of the camera.

5. Photographic apparatus comprising a camera having a focal plane for use with a supply of sensitized unexposed spliced film having a structural variation in predetermined relation to a splice, means for moving successive portions of said film into the focal plane of the camera, feeler means in position to be affected by said structural variation, and means including an electric circuit closed by movement of said feeler means for indicating the presence of a splice adjacent said focal plane.

6. Photographic film comprising two pieces of unexposed sensitized sheet material spliced to each other, a portion of one of said pieces in predetermined relation to said splice being removed for operating signalling means.

7. Photographic film comprising two pieces of sensitized sheet material spliced to each other, and an opening formed in each piece of sheet material adjacent the splice, the openings being in alinement with each other longitudinally of the film and being in a lateral position different from that used for any other openings in the film not adjacent a splice, so that said openings constitute a structural variation associated only with a splice in the film and capable of operating signalling means to indicate the presence of a splice.

PAUL LANDROCK.